(12) United States Patent
Hua et al.

(10) Patent No.: US 6,731,434 B1
(45) Date of Patent: May 4, 2004

(54) COMPACT LENS ASSEMBLY FOR THE TELEPORTAL AUGMENTED REALITY SYSTEM

(75) Inventors: Hong Hua, Urbana, IL (US); Jannick Rolland, Chuluota, FL (US)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 10/090,070

(22) Filed: Mar. 1, 2002

Related U.S. Application Data

(60) Provisional application No. 60/292,942, filed on May 23, 2001.

(51) Int. Cl.$^7$ .................. G02B 27/10; G02B 27/14; G02B 15/14
(52) U.S. Cl. .................. 359/619; 359/630; 359/682; 359/686; 359/687; 359/688
(58) Field of Search .................. 359/619, 682, 359/686, 687, 688, 689, 690, 691, 692, 683, 676, 756, 754, 757–795, 630

(56) References Cited

U.S. PATENT DOCUMENTS

| | | | | |
|---|---|---|---|---|
| 3,992,084 A | * | 11/1976 | Nakamura et al. | 350/186 |
| 4,669,810 A | | 6/1987 | Wood | 350/3.7 |
| 4,753,522 A | | 6/1988 | Nishina et al. | 350/470 |
| 4,863,251 A | | 9/1989 | Herloski et al. | 350/471 |
| 5,172,272 A | | 12/1992 | Aoki | 359/654 |
| 5,172,275 A | | 12/1992 | DeJager | 359/755 |
| 5,526,183 A | | 6/1996 | Chen | 359/629 |
| 5,621,572 A | | 4/1997 | Fergason | 359/630 |
| 5,625,495 A | | 4/1997 | Moskovich | 359/663 |
| 5,818,632 A | | 10/1998 | Stephenson | 359/565 |
| 6,028,606 A | | 2/2000 | Kolb et al. | 345/419 |
| 6,198,577 B1 | | 3/2001 | Kedar et al. | 359/663 |
| 6,271,972 B1 | | 8/2001 | Kedar et al. | 359/663 |
| 6,404,561 B1 | * | 6/2002 | Isono et al. | 359/683 |
| 6,404,562 B1 | * | 6/2002 | Ota et al. | 359/692 |
| 2003/0076591 A1 | * | 4/2003 | Ohmori et al. | 359/566 |

OTHER PUBLICATIONS

*An Ultra–Light and Compact Design and Implementation of Head–Mounted Projective Displays*, Hong Hua, et al., 2001, pp. 175–182.

"Innovative Diffractive Eyepiece for Helmet–Mounted Display," J. Bunkenburg, Jul. 1998, pp. 41–49.

* cited by examiner

*Primary Examiner*—Ricky Mack
*Assistant Examiner*—Tim Thompson
(74) *Attorney, Agent, or Firm*—Brian S. Steinberger; Law Offices of Brian S. Steinberger, P.A.

(57) ABSTRACT

A compact, ultra-light and high-performance projection optics lens assembly using Diffractive Optics Technology, plastic and glass optics, and Aspheric optics has been designed with only four elements. The lens may be included as is, or scaled to be included in all instruments using conventional Double-Gauss lens forms. The preferred lens is only 20 mm in diameter and 15 mm long has a weight of only 8 g. Thus, two lenses for head mounted stereo displays is only 16 g. Such a stereo display, known as a head-mounted projective display (HMPD), consists of a pair of miniature projection lenses, beam splitters, and miniature displays mounted on the helmet, and retro-reflective sheeting materials placed strategically in the environment.

21 Claims, 14 Drawing Sheets

COMPACT LENS ASSEMBLY FOR THE TELEPORTAL AUGMENTED REALITY SYSTEM

This invention relates to a lens assembly, and in particular to a compact lens assembly for a teleportal augmented reality system and this Application claims priority from U.S. Provisional Application Serial No. 60/292,942 filed May 23, 2001 and was funded in part by a grant number 1-R29-LM06322-01A1 awarded by the National Institute of Health.

BACKGROUND AND PRIOR ART

Networked virtual environments allow users at remote locations to use a telecommunication link to coordinate work and social interaction. Teleconferencing systems and virtual environments that use 3D computer graphics displays and digital video recording systems allow remote users to interact with each other, to view virtual work objects such as text, engineering models, medical models, play environments and other forms of digital data, and to view each other's physical environment.

A number of teleconferencing technologies support collaborative virtual environments which allow interaction between individuals in local and remote sites. For example, video-teleconferencing systems use simple video screens and wide screen displays to allow interaction between individuals in local and remote sites. However, wide screen displays are disadvantageous because virtual 3D objects presented on the screen are not blended into the environment of the room of the users. In such an environment, local users cannot have a virtual object between them. This problem applies to representation of remote users as well. The location of the remote participants cannot be anywhere in the room or the space around the user, but is restricted to the screen.

Head-mounted displays (HMDs) have been widely used for 3D visualization tasks such as surgical planning, medical training, or engineering design. The main issues of the conventional eyepiece-based HMD technology include tradeoffs between resolution and field-of-view (FOV), and between compactness and eye clearance, the presence of large distortion for wide FOV designs, the conflict of accommodation and convergence, the occlusion contradiction between virtual and real objects, the challenge of highly precise registration, and often the brightness conflict with bright background illumination. The concept of head-mounted projective displays (HMPDs) is an emerging technology that can be thought to lie on the boundary of conventional HMDs, and projective displays such as the CAVE technology.

The basic HMPD concept was first presented by Kijima and Ojika in 1997 (see Kijima and Ojika, "Transition between virtual environment and workstation environment with projective head-mounted display." Proceedings of IEEE 1997 Virtual Reality Annual International Symposium, IEEE Comput. Soc. Press. 1997, pp.130–7. Los Alamitos, Calif., USA.).

Also on Apr. 15, 1997, a U.S. Pat. No. 5,621,572 was also issued to Fergason on the conceptual idea of a display, i.e. optical, system for head mounted display using retro-reflector and method of displaying an image.

Independently, the technology of HPMD was developed by Parsons and Rolland as a tool for medical visualization (See Parsons and Rolland, "A non-intrusive display technique for providing real-time data within a surgeons critical area of interest." Proceedings of Medicine Meets Virtual Reality 98, 1998, pp.246–251). After the initial proof of concept using off-the-shelf components, a first-generation custom-designed HMPD prototype was built to investigate perception issues and quantify some of the properties and behaviors of the retro-reflective materials in imaging systems. Since, the projection system of the first-generation prototype was custom designed using a double-Gauss lens structure and built from commercially available components. The total weight of each lens assembly was about 50 grams (already a significant reduction compared to using off-the-shelf optics) with mechanical dimensions of 35 mm in length by 43 mm in diameter.

Common to all these teleconferencing systems is the use of lenses of various configurations and weights with distortions, lack of clarity and smearing of the televised images. Representative of lenses that might at first glance appear to be useful in the teleconferencing systems are also shown in:

U.S. Pat. No. 5,526,183 by Chen who teaches the use of a lens combining diffractive elements of both glass and plastic to reduce the weight and size of the lens within a conventional helmet mounted display rather than the necessary projective helmet mounted display; U.S. Pat. No. 5,173,272 by Aoki which discloses a four element high aperature lens with glass elements making it too heavy for helmet mounting;

U.S. Pat. No. 4,753,522 by Nishina et al which lens features all 4 plastic elements and is fully symmetrical which latter property is imposed by its restricted application—a copy machine lens; and, U.S. Pat. No. 4,669,810 by Wood which shows a head-mounted display with many (more than 4) optical elements in the relay optics.

Consequently, there is a need for an augmented reality display that mitigates the above mentioned disadvantages (in part by an improved compact optical lens that provides visible spectrum images without smears and of reduced weight) and has the capability to display virtual objects and environments, superimposes virtual objects on the "real world" scenes, provides "face-to-face" recording and display, be used in various ambient lighting environments, and corrects for optical distortion, while minimizing computational power and time. Lightweight and compactness are always of basic importance and/or highly desirable for lens applications and particularly for head-mounted devices.

SUMMARY OF THE INVENTION

The first objective of the present invention is to provide a compact lens of reduced weight.

The second object of this invention is to provide a compact lens assembly for HMPD.

The third object of this invention is to provide a compact lens assembly for a teleportal augmented reality system.

The fourth object of this invention is to provide a stereoscopic projection system with compact, projective optical lenses at the heart of the imaging.

A preferred embodiment of the invention encompasses a compact lens assembly comprising in cross-section: a positive (convex-concave) singlet lens; a plastic singlet lens having one of its faces an aspheric substrate plus a diffractive optical surface; a mid-located stop/shutter; a plastic singlet negative lens with a aspheric surface on one of the faces; and a glass singlet lens. The diffractive/glass combination in the overall lens, allows for visible spectrum images without color smear, while the plastic/glass combination allows for reduced overall weight. The key contribution of this invention lies in the conception, optimization, and assessment of ultra-light and high-performance projection optics.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Figure 1:
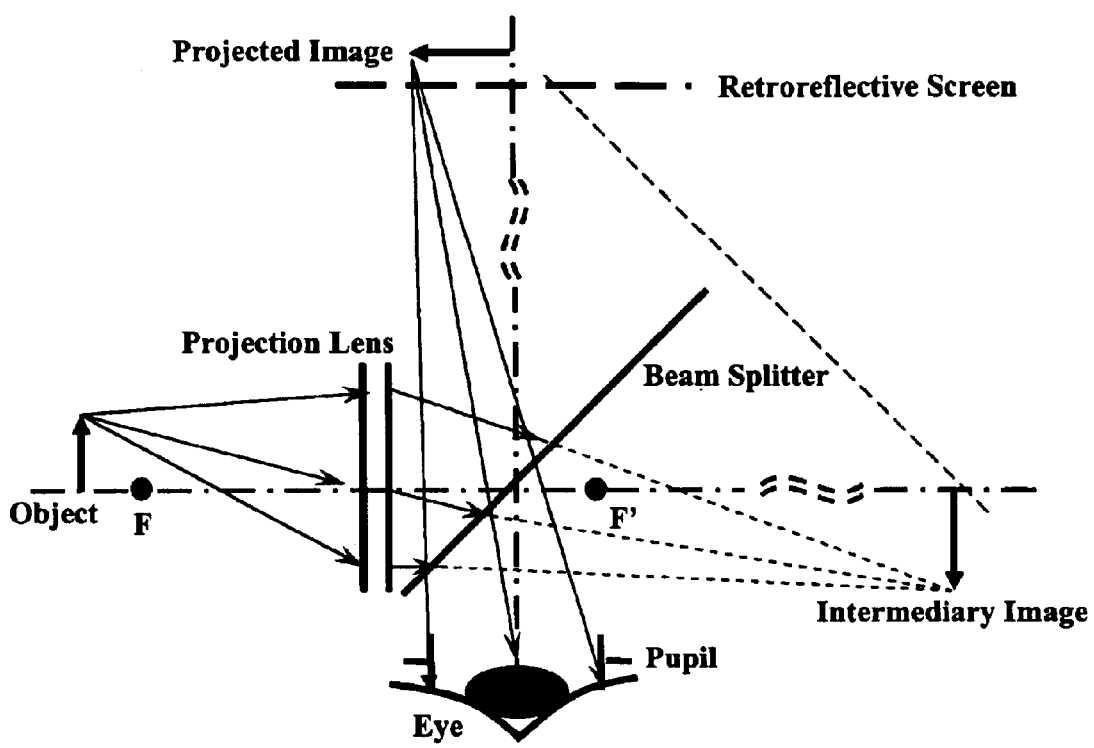
FIG. 1 is a concept illustrative side view of the preferred utilization of the novel compact lens in a Head Mounted Projection Device (HMPD).

It would be useful to discuss the meanings of some words used herein and their applications before discussing the compact lens assembly of the invention including:

HMPD—helmet mounted projection display;
singlet—single lens element
EFL—effective focal length
$F^\#$—f-number
OAL—overall length
FOV—field of view
EPD—entrance pupil diameter
AMLCD—Active Matrix Liquid Crystal Display Referring now to FIG. 1, there is seen in the concept of HMPD, a miniature display 501, located beyond the focal point of a projection lens 502, is used to display computer-generated image. Through the projection lens 502, an intermediary image 505 is formed at the conjugate location. A beamsplitter 503 is placed after the projection lens at 45 degrees with respect to the optical axis to bend the rays at 90 degrees; therefore, mirror image 506 of intermediary image 505 is projected symmetrically. Meanwhile, retro-reflective screen 504 is placed either side of the projected image 506 (the screen is in front of the projected image in the figure case) so that rays hitting the surface are reflected back upon themselves in the opposite direction and travel through the beamsplitter 503. As a result, the user's eye 508 will perceive the projected image 506 from the exit pupil 507 of the optical system.

Figure 2:
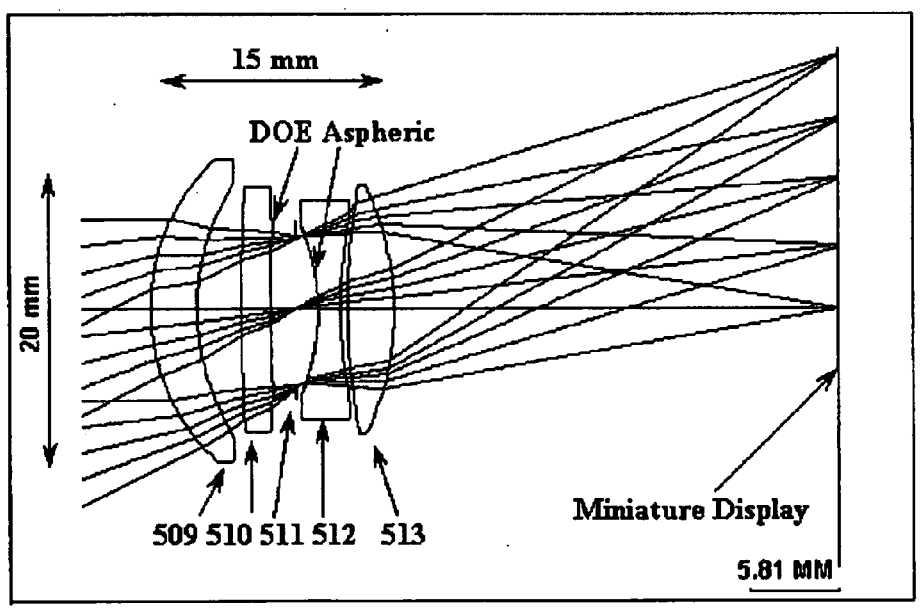
FIG. 2 is a cross-sectional side view of the behavior of different reflective surfaces.
Figure 3:
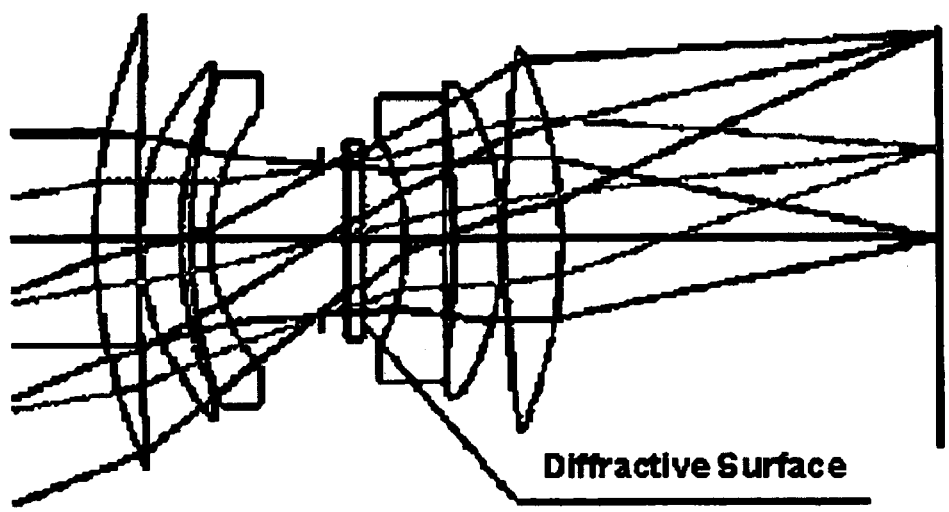
FIG. 3 is a cross-section of the H. Ogawa lens referenced in the PRIOR ART.

Projection lens 502 is custom-designed and its layout is shown in FIG. 2. The lens 502 is composed of a two glass singlet lenses, 509 and 513 respectively, two plastic singlet lenses, 510 and 512 respectively, and the stop surface 511 is between the glass-plastic and plastic-glass combinations. In particular, the second surface of plastic singlet lens 510 is designed with a diffractive optical element (DOE) on top of an aspheric substrate, and the first surface of plastic singlet 512 is an aspherical surface. Such a novel design makes it possible to achieve compactness, ultralight-weight, as well as good performance.

The specification of the preferred compact lens system of the invention is:

EFL=35 mm; $F^\#$=2.92; OAL=15.88 mm; FOV=52.4°; EPD=12 mm; weight=8 g

Overall Specifications

Considering a monocular configuration, the optical image source of an HMPD is a miniature display and its image is formed in visual space via a projective system and a flat combiner. When using a flat combiner (i.e. beam splitter), only the projection optics needs to be designed. The miniature display selected based on availability and cost was a 1.35" backlighting color AMLCDs with (640*3)*480 pixels and 42-um pixel size. Given the miniature display, wide field-of-view (FOV) and high resolution are always two contradictory but desirable requirements. Besides the consideration of resolution, there are two aspects of limitation on the targeted FOV. One is that using a flat beam splitter gives a maximum FOV of 90 degrees. The other is the fact that the significant retro-reflectivity drop-off of available retro-reflective materials beyond +−35 degrees of incidence imposes an upper limit on FOV for a flat mural display to avoid non-uniform image luminance. For non flat displays, such as arch displays, wider field of views can be achieved. The limitation is then that of the 90 degrees imposed by the beam splitter. Given the resolution of the flat panel display available for this design, a diagonal FOV between 50 and 55 degrees, which corresponds to a 36.9–33.1 mm of focal length, is preferred. It was decided to go to a 35 mm focal length yielding precisely a 52.4-degree FOV.

In the design of visual instruments, especially binocular HMPD, it is necessary to allow the wearers to swivel their eyes in their sockets. This requirement is becoming more critical for a pupil-forming system like HMPD.

As a result, the exit pupil size is specified to be 12 mm, though the diameter of the eye pupil is typically 3–5 mm in the lighting conditions provided by HMDs. This would allow a swivel of +/−25 degrees without causing vignetting in the overall FOV with a 3-mm eye pupil, as well as allow a tolerance of +−6 mm interpupilary distance (IPD) for different users in the case where IPD would not be set precisely. However for applications where accuracy of rendered depth is critical, the interpupilary distance between the two arms of the optics should be set to the IPD of the user, and the setting should be reflected in the computational model to display stereoscopic images. In terms of performance evaluation, 12-mm and 3-mm pupils will be assessed in object space and visual space, respectively.

An effective eye relief (eye clearance) of 23 mm is required to allow for all types of eyeglasses. It is always a design constraint for eyepiece type of HMDs because the optics size and therefore its weight scales directly with the increase in FOV, but it is not a direct limitation in HMPD because the eye clearance can be adjusted to the required specification by simply adjusting the separation between the projection lens and the beam splitter.

Optical system aberrations may cause either a decrease in image sharpness or warping of the image, the later allowing computational or electronic correction. In conventional HMD designs, it is common to optimize the design with respect to the optical aberrations that cannot be compensated electronically or computationally. In the case of projection optics, the location of the pupil within the lens, as opposed to outside the lens, naturally calls for low distortion. Therefore, primary aberrations such as spherical aberrations, astigmatism, coma, and distortion can be minimized in HMPD. The optical specification of the projection lens is summarized in Table 1.

Conception of an Ultra-light and Compact Design

An established effective way to design an ultra-light, compact, and high-quality lens is to use a combination of plastic components and diffractive optical elements (DOE) [see J. Bunkenburg and T. A. Fritz, "Innovative diffractive eyepiece for a helmet-mounted display," Proceedings of SPIE-the International Society for Optical Engineering, Vol. 3430, July 1998. San Diego, Calif., USA. P41–49].

In the design of large aperture projection systems, DOE may be applied to correct the secondary spectrum and residual spherical aberrations for apochromatic imaging, in place of using high-index lanthanum crown glasses. The advantages of using DOE over conventional refractive optics lie in the capability of designing large aperture and lightweight optical elements, achieving aspheric-like aberration correction, obtaining achromatization in combination with refractive elements, eliminating the need for exotic materials, gaining performance over conventional systems, and significantly reducing system weight, complexity, and cost.

With these considerations for head-mounted applications, the goal was to achieve a four-element compact design with two glass components and two plastic components. Utilizing a glass lens nearest to the eye and a glass lens nearest to the display provides a robust seal for the optical module, and allows utilization of plastics for the two middle components to reduce the overall weight. Exposal of glass components in the air, instead of plastic components, protects the system from oxidization, aging caused by reaction with acid in the air, or scratches. The first plastic component would have a DOE replicated upon one of its two surfaces to correct chromatic and spherical aberrations. A second aspheric surface can be applied to the second plastic component to further help optimize performance without the need to add an additional element.

Figure 4:
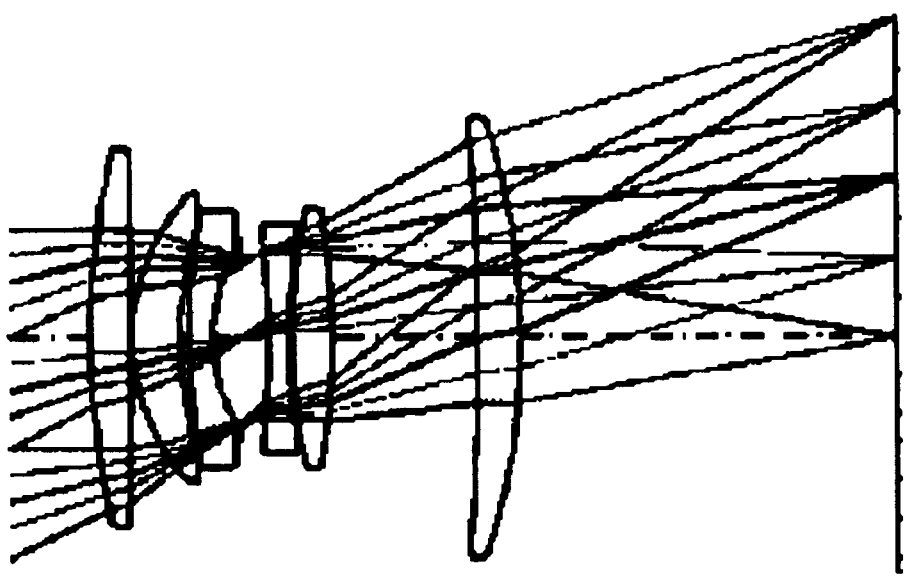
FIG. 4(a) shows the layout of a F2.9 double-Gauss lens.
FIG. 4(b) shows the polychromatic MTF performance of the lens profiled in FIG. 4(a) for a 12-mm pupil.
Figure 4:
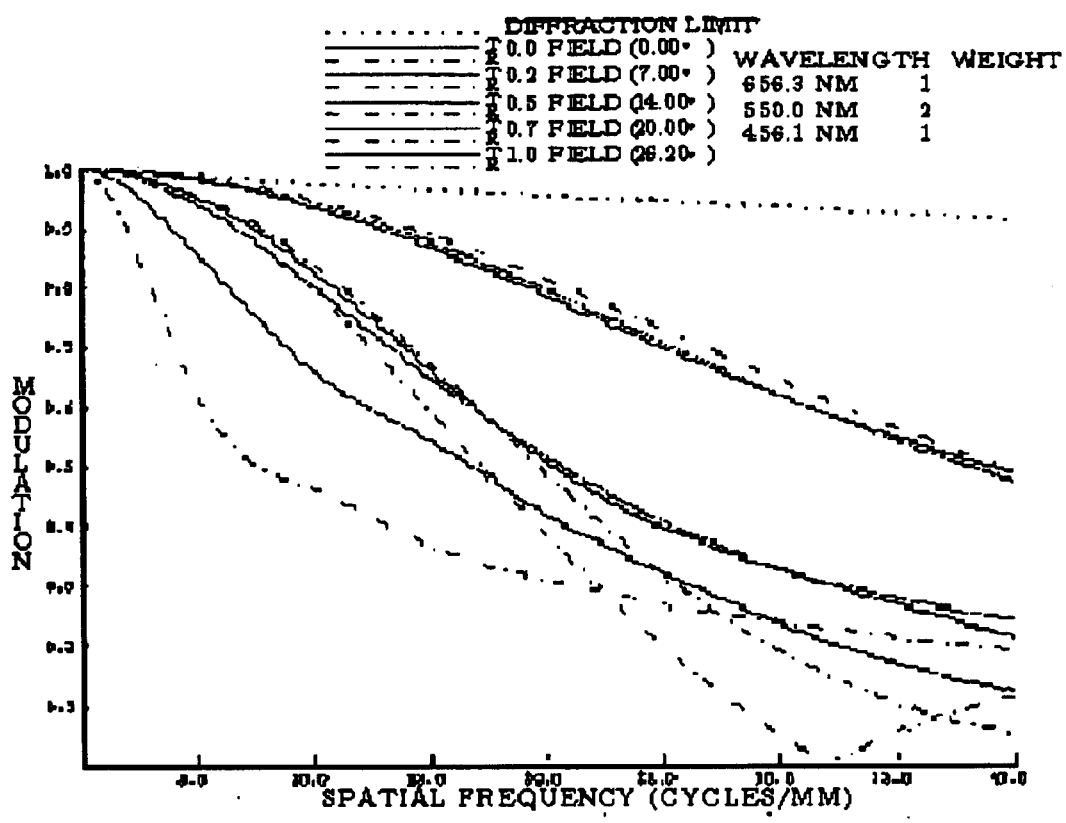

As a starting point to the design process, the Hideki Ogawa lens referenced in the PRIOR ART was considered which lens consists of a 51.75 mm F/1.46 apochromatic double-Gauss lens with a two-layer diffractive surface on a plane-parallel substrate. The layout of the lens is shown in FIG. 4. The second surface of the plate component has a replicated DOE. Its full FOV is 45.32 degrees.

In our approach, to reduce the number of elements to four, the plate just after the aperture shown in FIG. 4, which had a DOE element, was removed from the original design, then the resultant form was scaled to 35 mm focal length with a 12-mm entrance pupil, and a few cycles of optimization were executed to increase the image size to 17.2 mm in order to account for the size of the LCD image source. This process led to an optimized double-Gauss scaled starting point showed in FIG. 5(a) and its polychromatic diffraction MTF has been found to provide acceptable performance as a starting point for the design.

Figure 5:
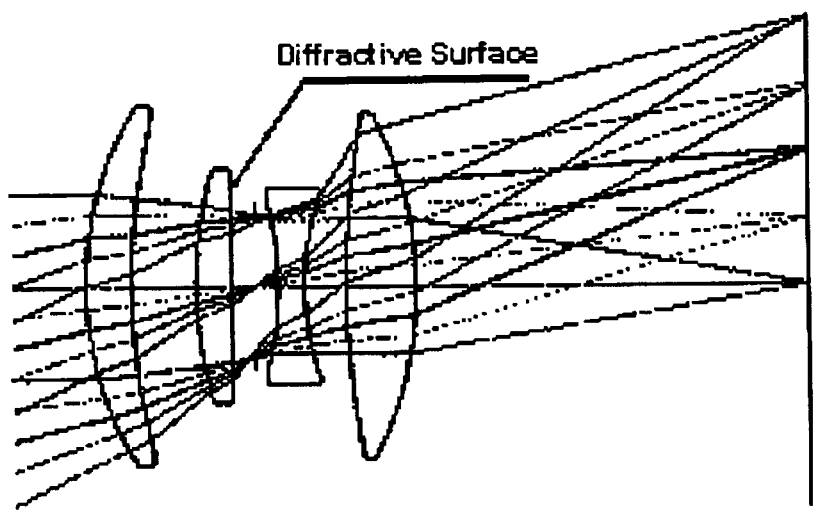
FIG. 5(a) shows the layout of a F2.9 4-element projection lens.
FIG. 5(b) shows the polychromatic MTF performance of the lens profiled in FIG. 5(a) for a 12-mm pupil.
Figure 5:
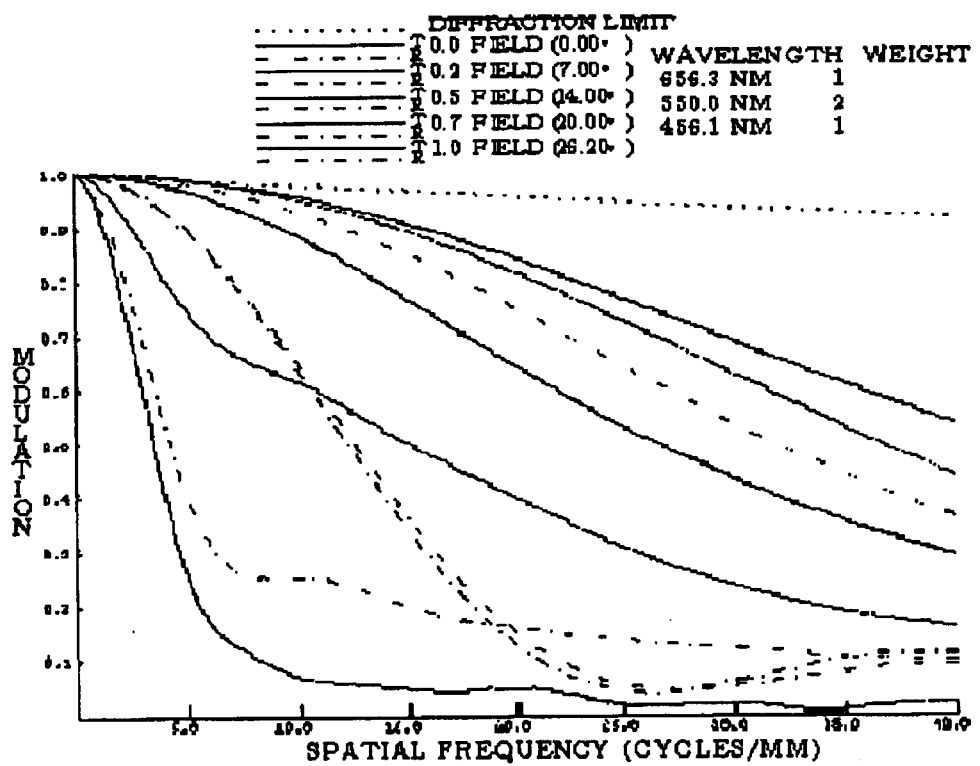
Figure 6:
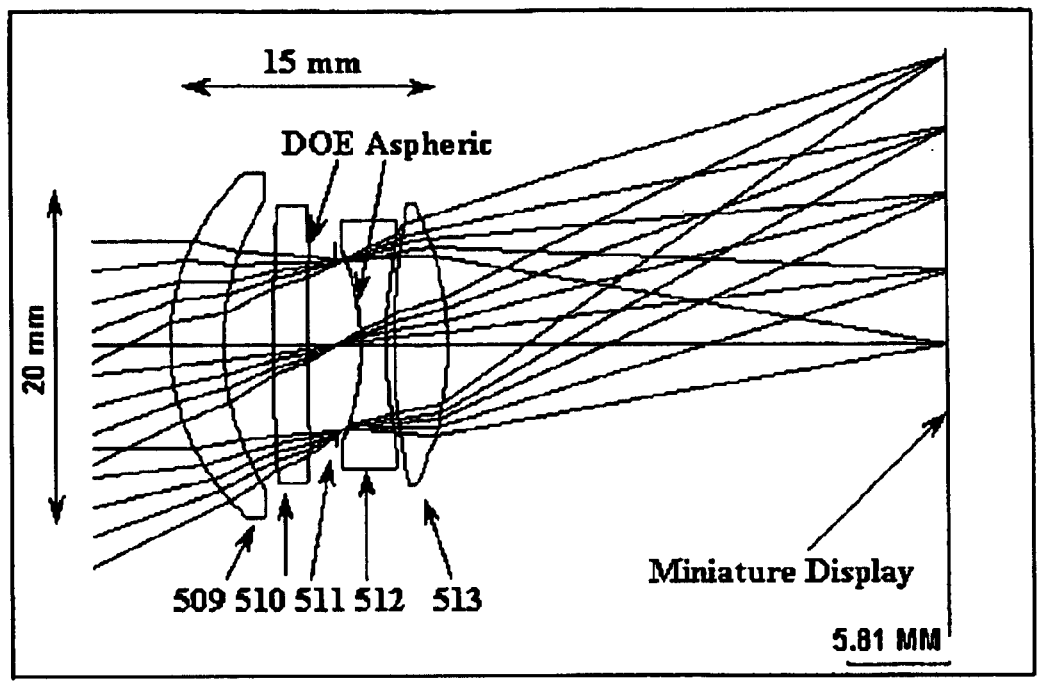
FIG. 6(a) shows a layout of the ultra-light projection lens.
FIG. 6(b) shows the lens assembly of the ultra-light projection lens.
Figure 6:
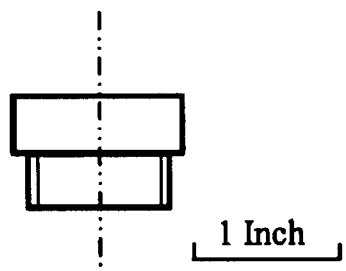

Adopting a strategy of gradual simplification and accounting for the fact that a singlet lens with a DOE can replace the functions of a doublet, the first glass doublet (component 2 and 3 in FIG. 4(a)) was replaced with a PMMA plastic singlet. Initial optimization was applied so that the second surface of the singlet was close to planar in order to replicate a DOE feature on the corresponding surface. A DOE feature with a spherical substrate was then designated to the second planar surface of the singlet. Further optimization was employed and led to a 5-component intermediary design. The MTF maintained more than 40% at 25 lp/mm resolution across the field of view, which lead us to further simplify the design. The next step was to replace the second doublet (component 4 and 5 in FIG. 4(a)) with a styrene plastic singlet with spherical surfaces. Initial optimization was applied and reached a 4-element design format, as shown in FIG. 5(a), which is the sought lens format. The final layout of the lens is shown in FIGS. 6(a) and 6(b).

The main constraints utilized during the conceptual design included a control of the effective focal length, field weights, and optical power on the DOE.

DOE Design

This section will concentrate on the various considerations for the DOE design, including selection of physical forms, optical power, substrate, phase function, and depth profile for fabrication considerations.

Typically, there are four physical forms of DOEs: zone plate, binary optics, photo-etched multi-level DOE, and Kinoform DOE. The latter kinoform DOE was selected because it is usually fabricated by diamond turning techniques that can cut the substrate shape and the DOE profile at the same time. Therefore, the substrate shape of a Kinoform DOE can be spherical, planar being a special case, or aspheric. Non-planar substrates provide more flexibility on higher-order aberration correction without increase in cost. DOEs can be viewed as a material with large dispersion but opposite in sign to conventional materials (i.e. the V-number of a DOE is approximately −3.5 for the visible spectrum). For monochromatic applications, DOEs are typically designed to have significant optical power and can be viewed as replacements for refractive optics.

However, for polychromatic applications, in which case our application belongs, DOEs are typically designed to have small optical power and their primary purpose is to minimize and balance residual optical aberrations, especially to obtain achromatization in combination with refractive elements. The commonly used diffraction orders are 0, +1 or −1. The +1 order of diffraction was adopted.

Figure 7:
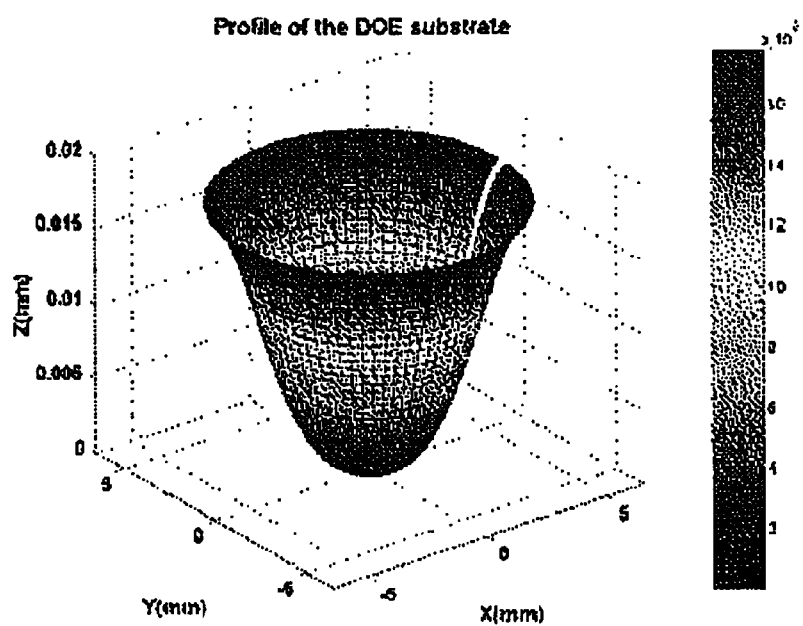
FIG. 7 shows the profile of the DOE substrate in mm.

While the substrate of the Kinoform can be spherical/aspheric, its curvature is required to be small enough for the fabrication of DOE features. The design further required an aspheric substrate to correct the higher order aberrations in a four-element system. The profile of the resulting aspheric substrate is shown in FIG. 7.

Figure 8:
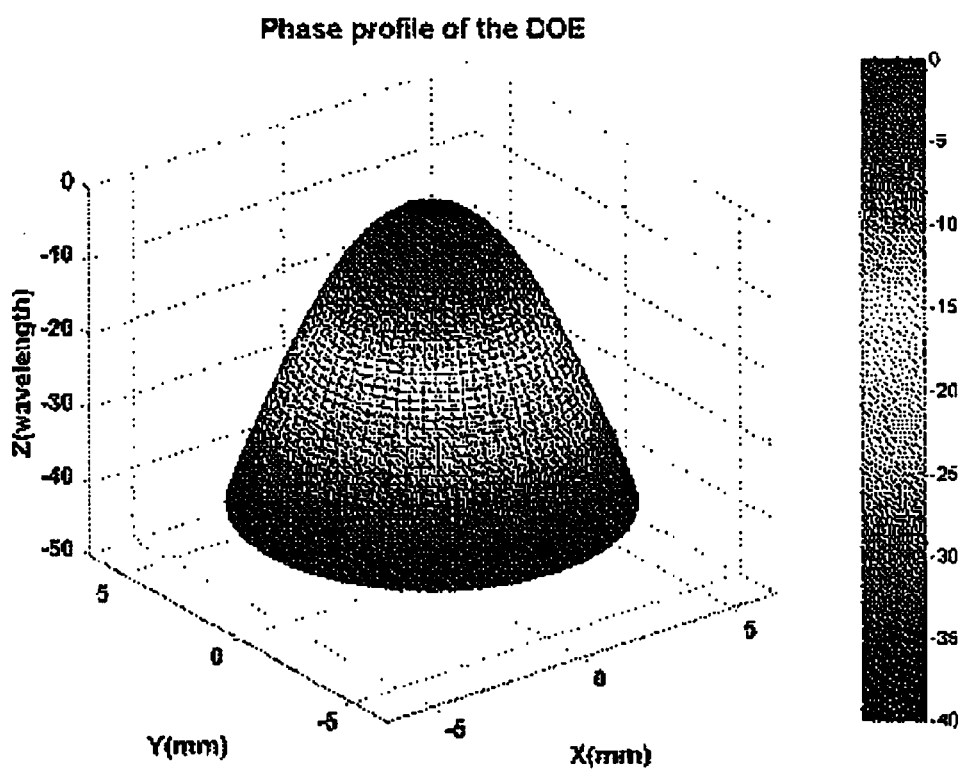
FIG. 8 shows the phase profile of the DOE in waves.

The periodic grating feature of the DOE is defined by a phase function. The phase profile across the radius of the element is shown in FIG. 8. The phase change reached around 55 times the wavelength, meaning that the maximum phase change is 55 times 2 Pi.

Figure 9:
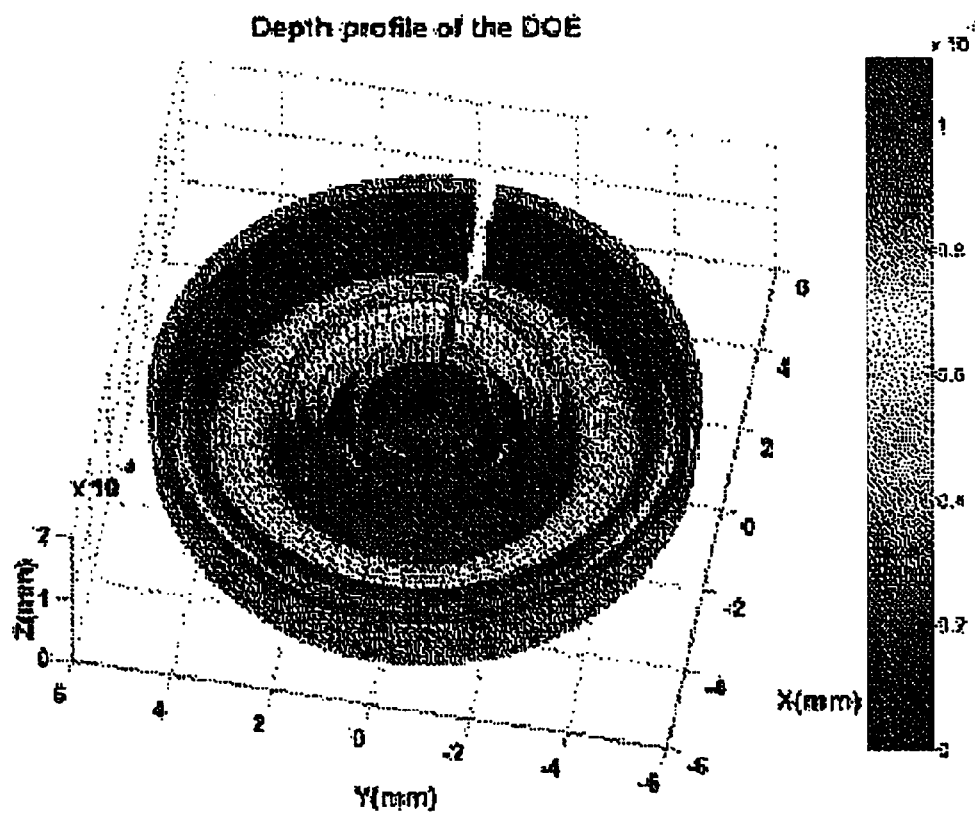
FIG. 9 shows the depth profile of the DOE in mm.
Figure 10:
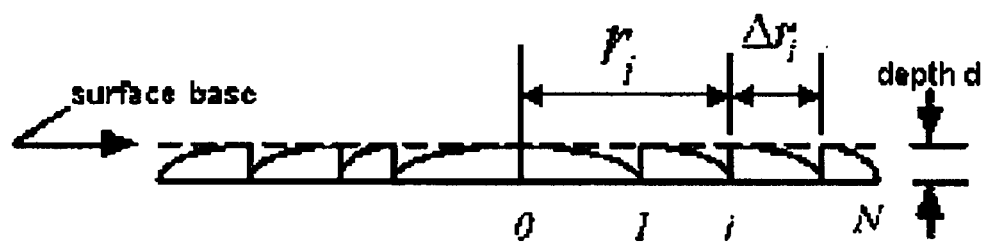
FIG. 10 illustrates the DOE parameters.

For fabrication, the phase function is transformed into a depth profile to define the feature parameters. The resulting DOE depth profile across the radius of the element is shown in FIG. 9. The DOE grating features can be specified by the feature depth, d, the radii of the zone transitions, r, the size of the zones, $\Delta r$, and the number of zones, N, as illustrated in FIG. 10. DOE manufacturers recommend a limit on the minimum zone size. For example, our manufacturer recommended that the minimum zone size be no smaller than 15 um. In the final design the radius of the DOE element $r_{max}$ is 6.5 mm, the depth period d is 1.12 um for a 550 nm wavelength, the minimum feature size is 74.65 um, and the number of zones is 55.

Optimization

The system was optimized with rays traced from the pupil to the miniature display, for a full un-vignetted 12-mm pupil, and a circular FOV of 52.4 degrees. The design is rotationally symmetric, requiring optimization only over half the FOV in one radial direction. During the process of optimization, all the curvatures of the refractive surfaces, the distance between two adjacent surfaces, the coefficients of the aspheric substrate and the DOE phase function, were set as variables. The effective focal length was constrained to be 35 mm. The thickness of the components and the space among them were bounded. The total thickness of the system was restricted in the last stage of the optimization for the sake of compactness. Five visual fields, 0, 0.2, 0.5, 0.7, and 1.0, (i.e. on axis, 7, 14, 21 and 26.2 degrees, respectively) were optimized. The weighting of the five fields were adjusted during the process of the optimization. The final weighting was 1.0, 0.8, 0.8, 0.5, 0.3, for each respective field.

Figure 11:
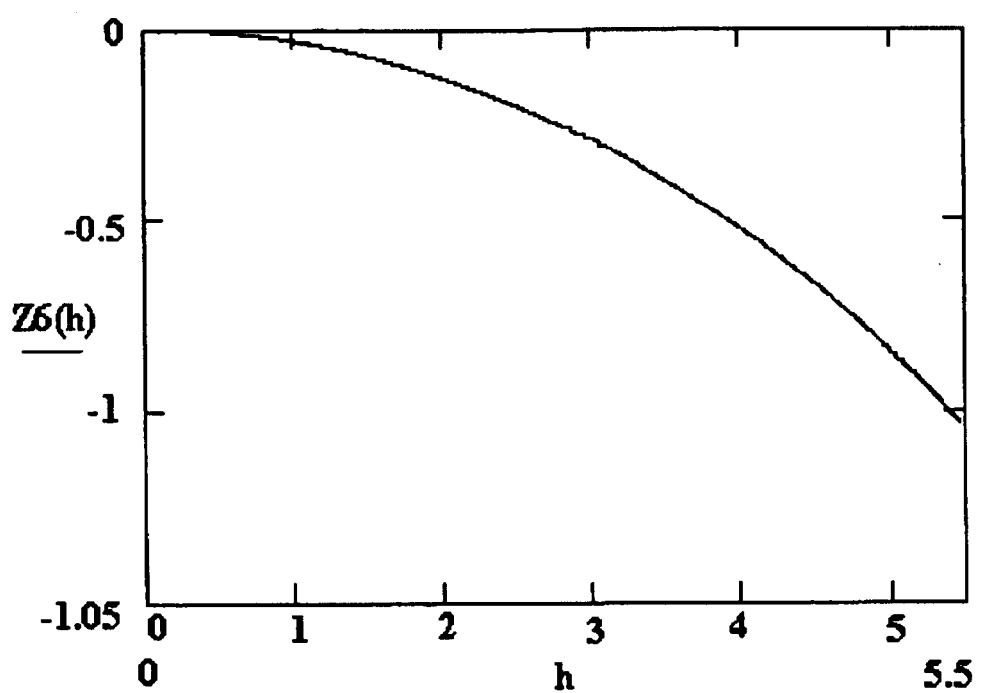
FIG. 11 shows the profile of the second aspheric surface in mm.

During the final optimization stage, an aspheric surface was added to the first surface of the third element to balance the aberrations and improve performance. The resulting profile of the aspheric surface is shown in FIG. 11, while the layout of the final design of the lens, and the lens assembly as earlier indicated are given in FIGS. 6(a) and 6(b).

Performance Evaluation

Since the improved axial performance of the design depends on the DOE surface, it is important to evaluate the diffraction efficiency of the DOE. Various performance measures will be presented. At least three essential potential optical limitations encountered in HMDs must be assessed: field curvature (defocusing across the FOV); astigmatism; and, for color displays, transverse chromatic smear.

a). DOE Diffraction Efficiency

Figure 12:
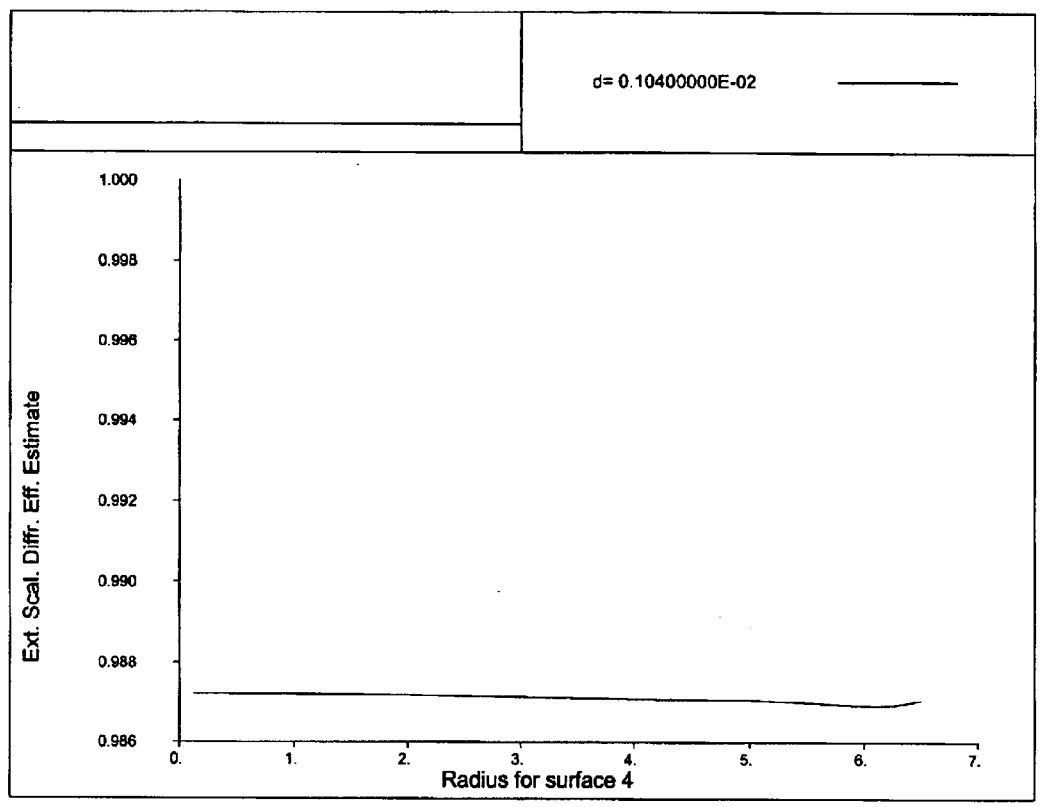
FIG. 12(a) shows the diffraction efficiency of the DOE across the radius.
FIG. 12(b) shows the diffraction efficiency of the DOE vs. wavelength.
Figure 12:
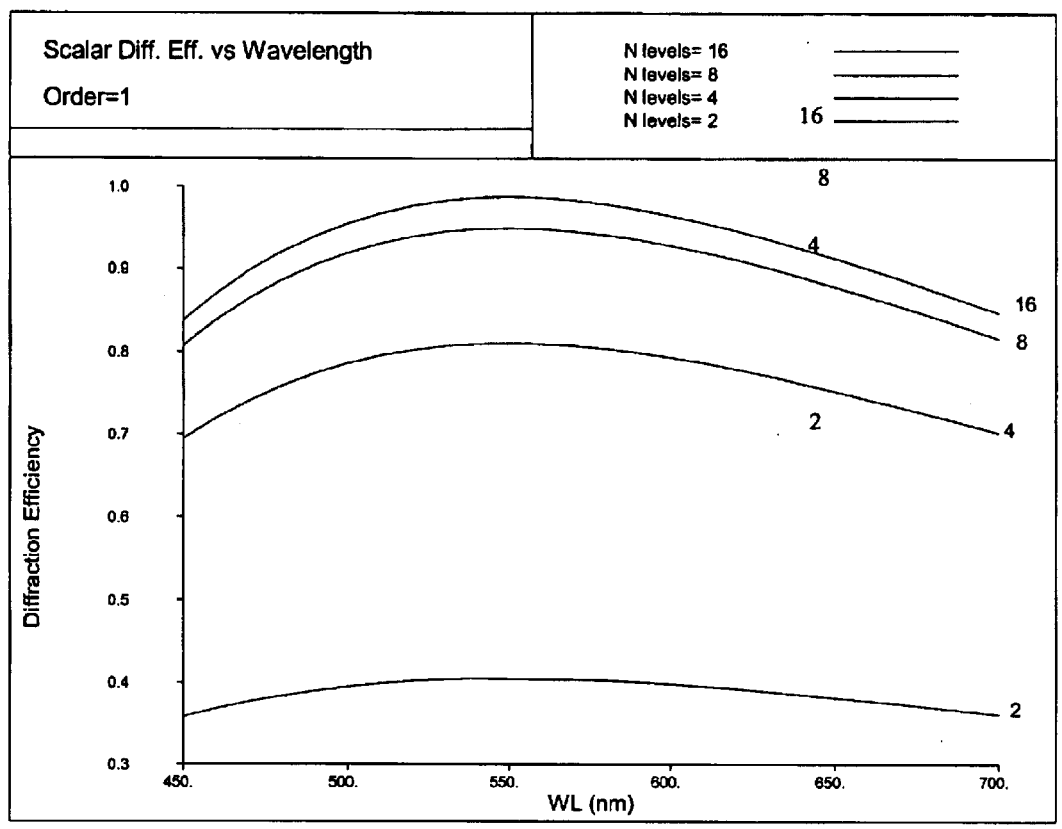

As predicted by rigorous vector diffraction efficiency, the diffraction efficiency of DOE drops down as its features gets finer near the edge. The relationship of the diffraction efficiency across the radius for the designed wavelength (i.e. 550 nm) is shown in FIG. 12(a). Results show that there is slight decrease across the radius but the variation is extremely small, ranging from 0.9998 to 0.9995.

The diffraction efficiency is also wavelength dependent. The diffraction efficiency of the Kinoform DOE is predicted by using large number of masks, for example, 16 levels of binary masks. FIG. 12(b) shows the relationship of the diffraction efficiency as a function of the wavelength. Results show that the efficiency variation ranges from 85% to close to 100% for the visible spectrum.

b) Performance in Object Space

In this section, the various optical performance of the optimized lens is assessed in object space across the five representative field angles for three wavelengths (656.3 nm, 550 nm, and 456.1 nm). A 12-mm full size pupil is considered in object space. The rayfan plots and the spot diagrams, shown in FIGS. 13(a) and (b), respectively, are presented across the five representative field angles. Residual higher order coma in the design is observed. The spot diagrams demonstrate the overall high performance of the design, where the maximum RMS spot diameter is 0.03 mm which is smaller than the pixel size (i.e. 0.042 mm) of the LCD display.

Figure 13:
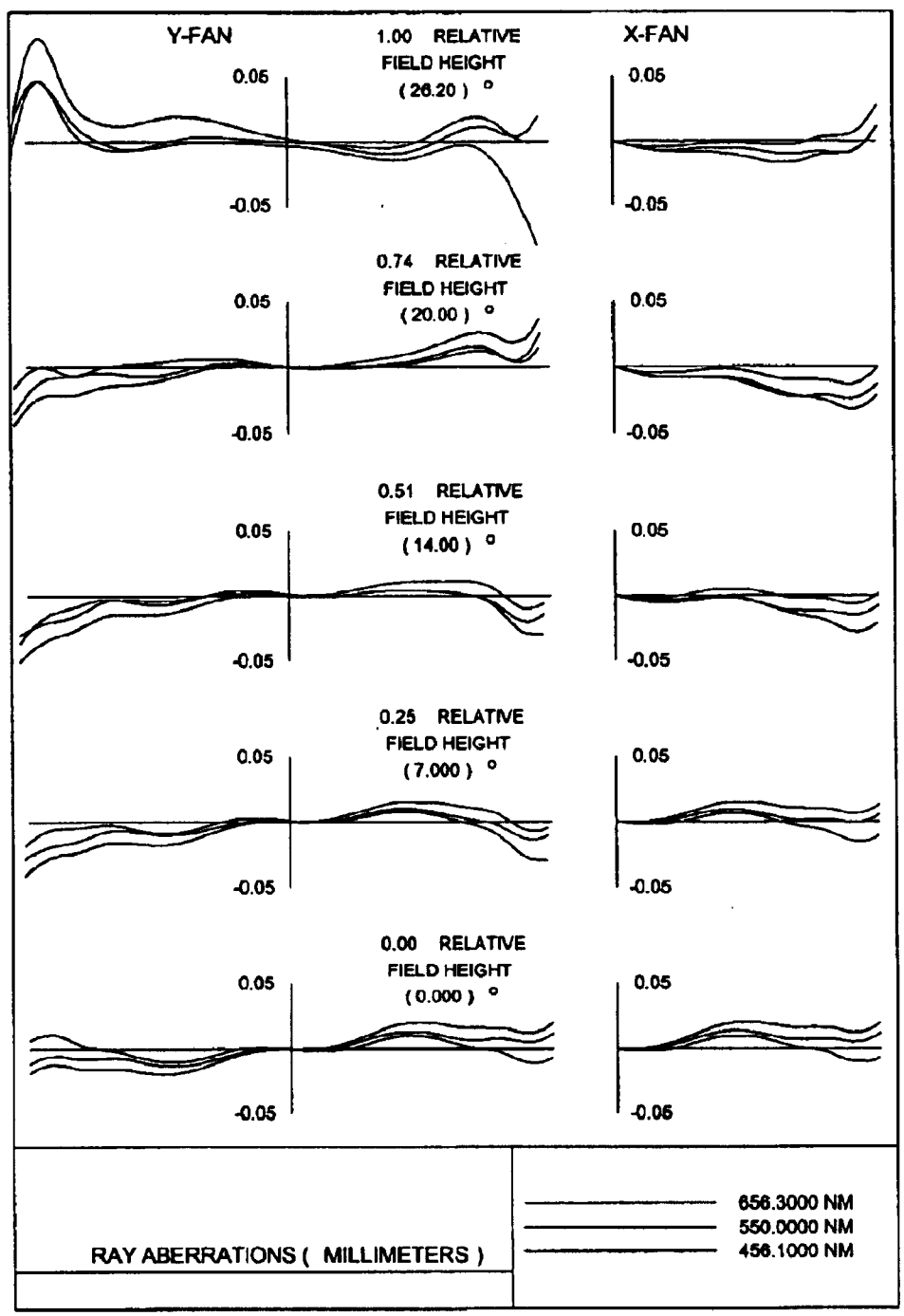
FIG. 13(a) shows the lens performance for the 12-mm full-size pupil in object space: Rayfan plot across the five field angles
FIG. 13(b) shows the lens performance for the 12-mm full-size pupil in object space: Spot diagram across the five field angles
FIG. 13(c) shows the lens performance for the 12-mm full-size pupil in object space: Longitudinal spherical aberration, astigmatism and distortion
FIG. 13(d) shows the lens performance for the 12-mm full-size pupil in object space: Polychromatic MTF as a function of the spatial frequency in linepairs/mm.
Figure 13:
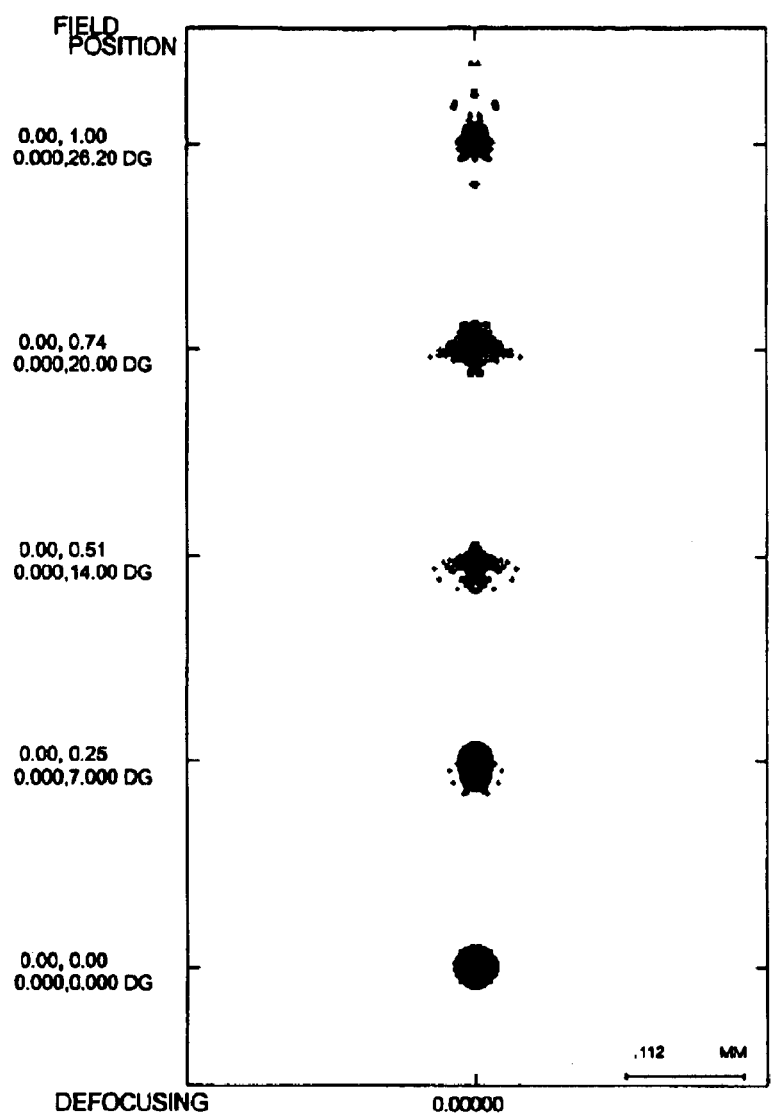
Figure 13:
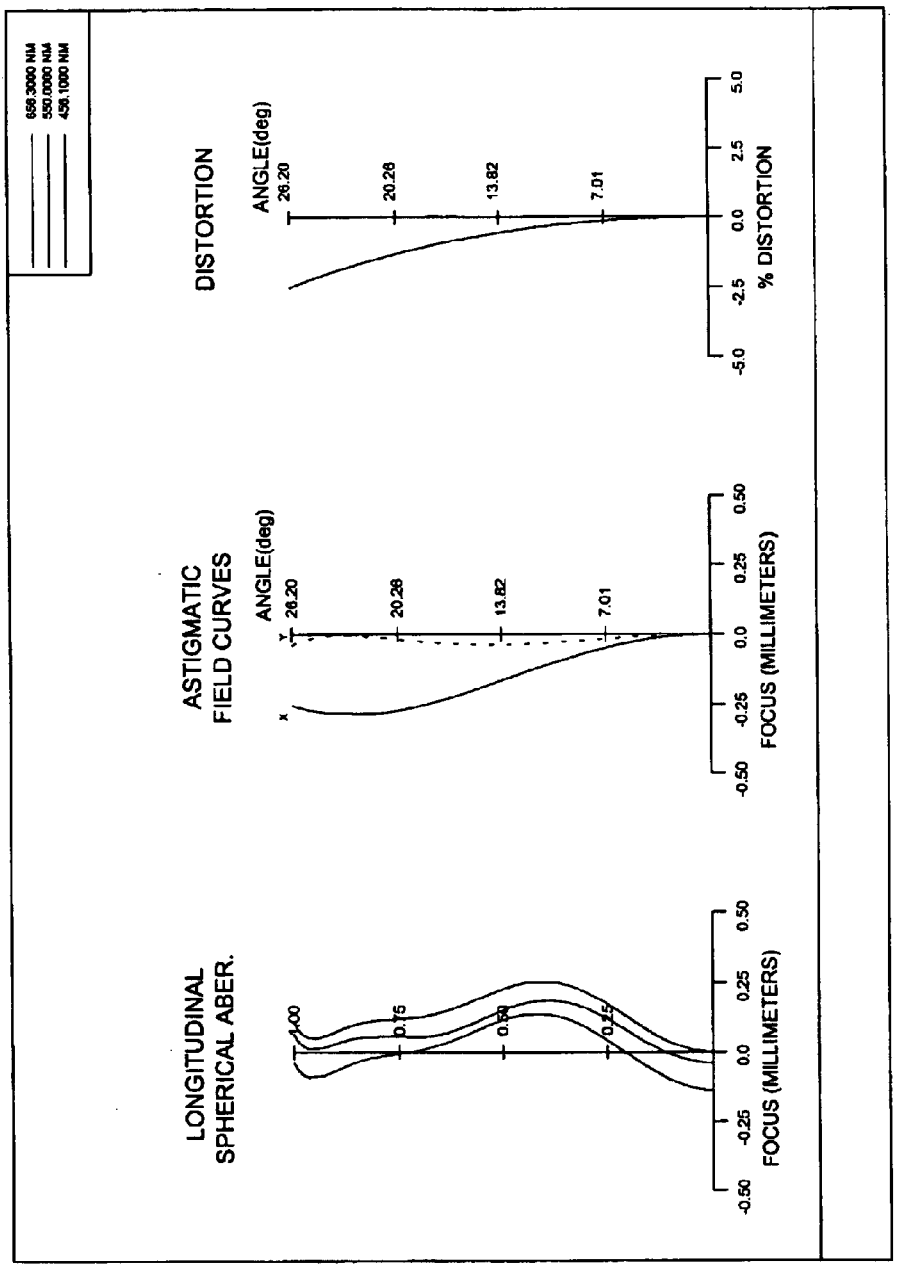
Figure 13:
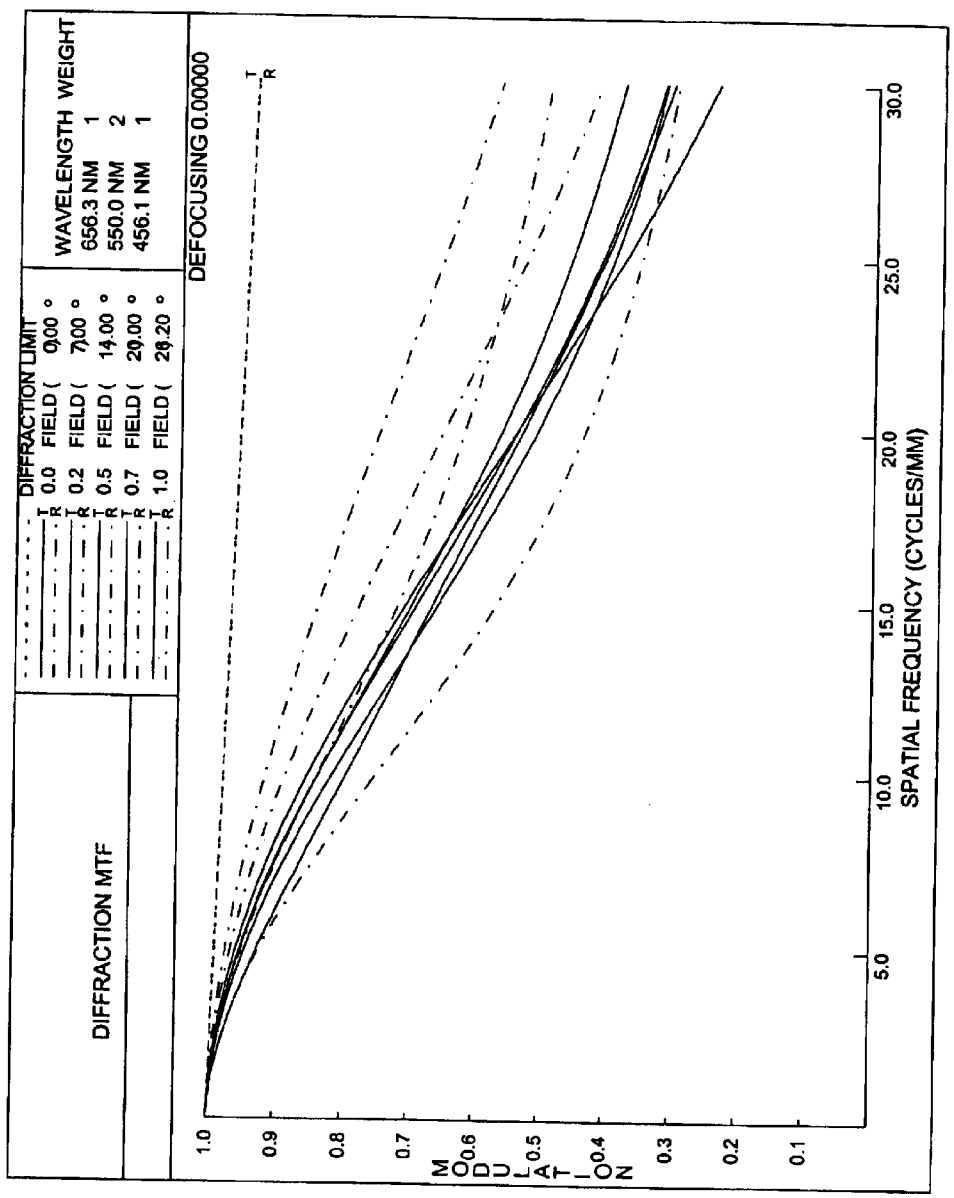

The primary aberrations, including longitudinal spherical aberrations, astigmatic field curves and distortion are shown in FIG. 13(c) for a 12-mm pupil. The maximum spherical aberration occurs at 0.4 in the aperture. The performance shows that the residual astigmatism is well balanced over the entire FOV. The residual astigmatism reaches a maximum of 0.25 mm at 21 degrees FOV. The distortion of the system is well corrected and is less than 2.5% across the overall FOV. The polychromatic diffraction MTF for the full 12-mm pupil is presented across the five representative field angles, shown in FIG. 13(d). The target LCD display (Table 1) set forth hereafter:

TABLE 1

Optical design specification

| Parameter | Specification |
| --- | --- |
| Object: Color LCD | |
| a. Size | 1.35 inch in diagonal |
| b. Active display area | Rectangle, 26.4 mm × 19.8 mm |
| c. Resolution | 640 × 480 pixels |
| Lens: | |
| a. Type | Projection lens |
| b. Effective focal length | 35 mm |
| c. Exit pupil diameter | 12 mm |
| d. Eye relief | 25 mm |
| e. No. of diffractive surface | 1 |
| Other Parameters: | |
| Wavelength range | 656 to 485 nm |
| FOV | 52.4° in diagnonal |
| Distortion | <2.5% over entire FOV | has a spatial frequency of approximately 25 lp/mm, given a 42-um pixel size. The modulation ratio of the presented design at 25 lp/mm is more than 40% across the overall fields. Therefore, the lens design will not limit the system resolution.

The head-mounted projective display (HMPD) is based on novel innovative technology when one uses the compact lens of the invention for 3D visualization. The HMPD main advantages include the capabilities of: 1) achieving a larger FOV and easier correction of optical distortion than conventional eyepiece-based optical see-through HMDs; 2) allowing correct occlusion of virtual objects in augmented environments; 3) projecting undistorted images on curved surfaces at arbitrary position; and, 4) creating independent viewpoints without crosstalk in multi-user environments.

The foregoing discussion of the COMPACT LENS of the invention has reduced weight and additional useful properties as a projection lens and as an assembly for the teleportal augmented reality system by using the combination of diffractive optical element (DOE), plastic components and aspheric surfaces for generating a new generation of HMPDs which have been integrated with the novel lens.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A compact lens assembly comprising:
   a positive convex-concave singlet lens;
   a plastic singlet lens adjacent to the positive lens, having one face being an aspheric substrate plus a diffractive optical surface;
   a mid-located stop/shutter positioned adjacent to the singlet lens;
   a plastic singlet negative lens with an aspheric surface on one of the faces adjacent to the stop/shutter; and
   a glass singlet lens adjacent to the negative lens, whereby the diffractive lens and the glass lens, and combination of the plastic and glass lens allows for visible spectrum images without smears and reduced weight.

2. The compact lens assembly of claim 1, wherein the assembly includes:
   dimensions of approximately 15 mm by approximately 20 mm.

3. The compact lens assembly of claim 1, further comprising:
   a helmet for mounting the lens assembly thereon for a head mounted display.

4. The compact lens assembly of claim 3, wherein the lens assembly is mounted in duplicate on said helmet, whereby the display is in stereo.

5. The compact lens assembly of claim 1, further comprising:
   a light source combined with the assembly, the light source positioned to be beamed through said lens whereby said combination is used in projection lens applications.

6. A method of forming a compact lens display assembly comprising the steps of:
   (a) combining two aspheric plastic negative lenses with two positive glass lenses to form a combination of four element optics; and
   (b) combining said combination of four element optics with additional diffractive optics whereby said lens display assembly provides visible spectrum images without smears.

7. The method of claim 6, further comprising the step of:
   applying the assembly to a projection lens system.

8. The method of claim 7, further comprising the step of:
   applying the assembly to a head mounted display system.

9. The method of claim 6, further comprising the step of:
   fitting the assembly into a space having dimensions of approximately 15 mm by approximately 20 mm.

10. The method of claim 9, further comprising the step of:
    mounting the assembly in a head mount.

11. A four lens component compact lens assembly comprising in combination:
    a positive singlet first lens;
    a singlet second lens adjacent and no intervening lenses to the positive lens, having one face being an aspheric substrate plus a diffractive optical surface;
    a mid-located stop/shutter positioned adjacent and no intervening lenses to the singlet lens;
    a singlet negative third lens with a aspheric surface on one face adjacent and no intervening lenses to the stop/shutter; and
    a singlet fourth lens adjacent and no intervening lenses to the third lens, whereby the four lens assembly allows for visible spectrum images without smears and reduced weight.

12. The assembly of claim 11, wherein the first lens includes:
    a convex-concave lens.

13. The assembly of claim 11, wherein the second and the third lens include:
    plastic singlet lens.

14. The assembly of claim 11, wherein the fourth lens includes:
    a glass lens.

15. The compact lens assembly of claim 11, wherein at least one of the first lens, the second lens, the third lens and the fourth lens includes:
    a combination of a plastic lens and a glass lens.

16. The compact lens assembly of claim 11, wherein the assembly includes:
    dimensions of approximately 15 mm by approximately 20 mm.

17. A four lens component compact lens assembly comprising in combination:
    a positive singlet first lens;
    a plastic singlet second lens adjacent to the positive lens, having one face being an aspheric substrate plus a diffractive optical surface;
    a mid-located stop/shutter positioned adjacent to the singlet lens;
    a plastic singlet negative third lens with a aspheric surface on one face adjacent to the stop/shutter; and
    a singlet fourth lens adjacent to the third lens, whereby the four lens assembly allows for visible spectrum images without smears and reduced weight.

18. A four lens component compact lens assembly comprising in combination:
    a positive singlet first lens;
    a singlet second lens adjacent to the positive lens, having one face being an aspheric substrate plus a diffractive optical surface;
    a mid-located stop/shutter positioned adjacent to the singlet lens;
    a singlet negative third lens with a aspheric surface on one face adjacent to the stop/shutter; and
    a glass singlet fourth lens adjacent to the third lens, whereby the four lens assembly allows for visible spectrum images without smears and reduced weight.

19. A four lens component compact lens assembly comprising in combination:

a positive singlet first lens;

a singlet second lens adjacent to the positive lens, having one face being an aspheric substrate plus a diffractive optical surface;

a mid-located stop/shutter positioned adjacent to the singlet lens;

a singlet negative third lens with a aspheric surface on one face adjacent to the stop/shutter; and a singlet fourth lens adjacent to the third lens, whereby the four lens assembly allows for visible spectrum images without smears and reduced weight, wherein the assembly has dimensions of approximately 15 mm by approximately 20 mm.

20. A method of forming a compact lens display assembly comprising the steps of:

(a) combining aspheric negative lenses with positive lenses;

(b) combining said combined lens with additional diffractive optics whereby said lens display assembly provides visible spectrum images without smears; and (c) fitting the lens display assembly into a space having dimensions of approximately 15 mm by approximately 20 mm.

21. The method of claim 20, further comprising the step of:

mounting the assembly in a head mount.

\* \* \* \* \*

UNITED STATES PATENT AND TRADEMARK OFFICE
CERTIFICATE OF CORRECTION

| | | |
|---|---|---|
| PATENT NO. | : 6,731,434 B1 | Page 1 of 1 |
| APPLICATION NO. | : 10/090070 | |
| DATED | : May 4, 2004 | |
| INVENTOR(S) | : Hong Hua | |

It is certified that error appears in the above-identified patent and that said Letters Patent is hereby corrected as shown below:

In the Specification

Col. 1, line 5 should read as follows:

STATEMENT REGARDING FEDERALLY SPONSORED RESEARCH OR DEVELOPMENT

This invention was made with Government support under Agency contract LM006322 awarded by the National Institutes of Health. The Government has certain rights in this invention.

Signed and Sealed this
Twenty-fifth Day of February, 2014

Michelle K. Lee
*Deputy Director of the United States Patent and Trademark Office*